US012606988B2

(12) United States Patent
Barngrover et al.

(10) Patent No.:  US 12,606,988 B2
(45) Date of Patent:       Apr. 21, 2026

(54) HOT SWAPPABLE BATTERY CONFIGURATION

(71) Applicant: Caterpillar Inc., Peoria, IL (US)

(72) Inventors: Michael John Barngrover, Brimfield, IL (US); Corey Allen Kauk, Elk River, MN (US); Mark Andrew Robinson, Davis Junction, IL (US); Steven Robert Krause, Chillicothe, IL (US); Ben Evans, Peoria, IL (US); Keith Nicholas Troisi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 163 days.

(21) Appl. No.: 18/374,885

(22) Filed: Sep. 29, 2023

(65) Prior Publication Data

US 2025/0109572 A1      Apr. 3, 2025

(51) Int. Cl.
*E02F 9/20*          (2006.01)
*H02J 9/06*          (2006.01)

(52) U.S. Cl.
CPC ............ *E02F 9/2091* (2013.01); *H02J 9/061* (2013.01)

(58) Field of Classification Search
CPC ......... E02F 9/2091; H02J 9/061; B60L 53/80; B60L 50/66
See application file for complete search history.

(56) References Cited

U.S. PATENT DOCUMENTS 5,647,721 A    7/1997  Rohrbaugh
11,358,486 B2   6/2022  Li et al.

2014/0176073 A1*  6/2014  Shrinkle ................. B60L 58/25
                                        320/126
2020/0199848 A1*  6/2020  Sugiyama ............... B60L 1/003
2022/0097555 A1*  3/2022  Koga ......................... B60S 5/06
2022/0348108 A1*  11/2022  Hajimiri ................. B60L 55/00
(Continued)

FOREIGN PATENT DOCUMENTS

CN        1457304 A      11/2003
CN      114086625 B       3/2023
(Continued)

OTHER PUBLICATIONS

Written Opinion and International Search Report for Int'l. Patent Appln. No. PCT/US2024/042015, mailed Nov. 26, 2024 (31 pgs).

*Primary Examiner* — Aaron L Troost
(74) *Attorney, Agent, or Firm* — vonBreisen

(57)          ABSTRACT

The electric vehicle that may comprise an electrical power system that includes a first DC link; a first swappable battery in electrical communication with the first DC link, and a second swappable battery substantially the same as the first swappable battery. The first swappable battery is configured to provide power to the electric vehicle during normal operation of the electric vehicle and to at least a first operation of the electric vehicle while the second swappable battery is removed from the electric vehicle and replaced. The second swappable battery is substantially the same as the first swappable battery and disposed on the electric vehicle, the second swappable battery configured to provide power to the electric vehicle during normal operation of the electric vehicle and to at least a second operation of the electrical vehicle while the first swappable battery is removed from the electric vehicle.

15 Claims, 4 Drawing Sheets

(56)     References Cited

U.S. PATENT DOCUMENTS

| | | | |
|---|---|---|---|
| 2023/0065470 A1* | 3/2023 | Wang | B60L 53/36 |
| 2024/0136645 A1* | 4/2024 | Ward | B60L 53/35 |
| 2024/0149746 A1* | 5/2024 | Guralp | B60L 58/20 |

FOREIGN PATENT DOCUMENTS

| | | | |
|---|---|---|---|
| JP | 2966774 B2 | 10/1999 |
| JP | 2001010350 A | 1/2001 |
| WO | 2023287660 A1 | 1/2023 |

* cited by examiner

HOT SWAPPABLE BATTERY CONFIGURATION

TECHNICAL FIELD

The present disclosure generally relates to machines and vehicles, and more particularly, for electric machines and vehicles that include batteries.

BACKGROUND

As electrification expands throughout industrial applications, machine run time and up time are critical to delivering profitable production. Industrial machines are utilized at a higher duty cycle than passenger vehicles, and waiting for a battery to recharge reduces efficiency and the volume of work provided. To reduce the wait for battery recharging, some machines carry on-board one or more extra smaller supplemental "pony" batteries that are used to power machine systems while the main batteries used to power the machine are replaced with recharged batteries. This introduces extra weight on the machine, which increases fuel consumption, complexity and reduced production efficiency. Moreover, for machines that have distributed power inverters, the use of the pony battery during the replacement process can pose the challenge of managing wave reflection/current sloshing that may occur on the DC link.

CN 1140086625B discloses an electric excavator, wherein an auxiliary power battery pack is fixedly mounted on the upper body. The main power battery pack and the auxiliary power battery pack are both electrically connected with the power supply control device, and the power supply control device switches among the electric drive system, the main power battery pack and the auxiliary power battery pack to control the main power battery pack to charge the auxiliary power battery pack. While beneficial, a better arrangement is desired.

SUMMARY OF THE DISCLOSURE

In one aspect of the present disclosure, an electric vehicle is disclosed. The electric vehicle may comprise an electrical power system that includes: a first DC link; a first swappable battery disposed on the electric vehicle and in electrical communication with the first DC link; and a second swappable battery substantially the same as the first swappable battery and disposed on the electric vehicle. The first swappable battery configured to provide power to the electric vehicle during normal operation of the electric vehicle and to at least a first operation of the electric vehicle while the second swappable battery is removed from the electric vehicle and replaced. The second swappable battery substantially the same as the first swappable battery and disposed on the electric vehicle, the second swappable battery configured to provide power to the electric vehicle during normal operation of the electric vehicle and to at least a second operation of the electrical vehicle while the first swappable battery is removed from the electric vehicle.

In another aspect of the disclosure, a battery hot swapping on an electric machine is disclosed. The machine may comprise: a first swappable battery and a second swappable battery, each of the first swappable battery and the second swappable battery configured to provide power to the electric machine during normal operating mode of the machine via an electrical power system disposed on the electric machine. The method may comprise after a charge level of the first swappable battery is less than a threshold, disconnecting the first swappable battery from the electrical system; removing the first swappable battery from the machine with a swapping tool while the second swappable battery provides power to one or more operational functions of the electric machine via the electrical system; replacing on the machine the first swappable battery with a third swappable battery using the swapping tool, the third swappable battery substantially the same as the first swappable battery; and connecting the third swappable battery to the electrical system.

In yet another aspect of the disclosure, an electric machine is disclosed. The electric machine may comprise an electrical power system. The electric power system may include: a first DC link electrically coupled to a first inverter; the first inverter electrically coupled to a motor, a pump or an actuator; a first swappable battery disposed on the electric machine and in electrical communication with the first DC link; and a second swappable battery substantially the same as the first swappable battery and disposed on the electric machine. The first swappable battery configured to provide power to the electric machine during normal operation of the electric machine and to at least a first operation of the electric machine while a second swappable battery is removed from the machine and replaced. The second swappable battery configured to provide power to the electric machine during normal operation of the electric machine and to at least a second operation of the electrical vehicle while the first swappable battery is removed from the electric machine. Wherein, the first operation of the machine includes operation of the motor, the pump or the actuator.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
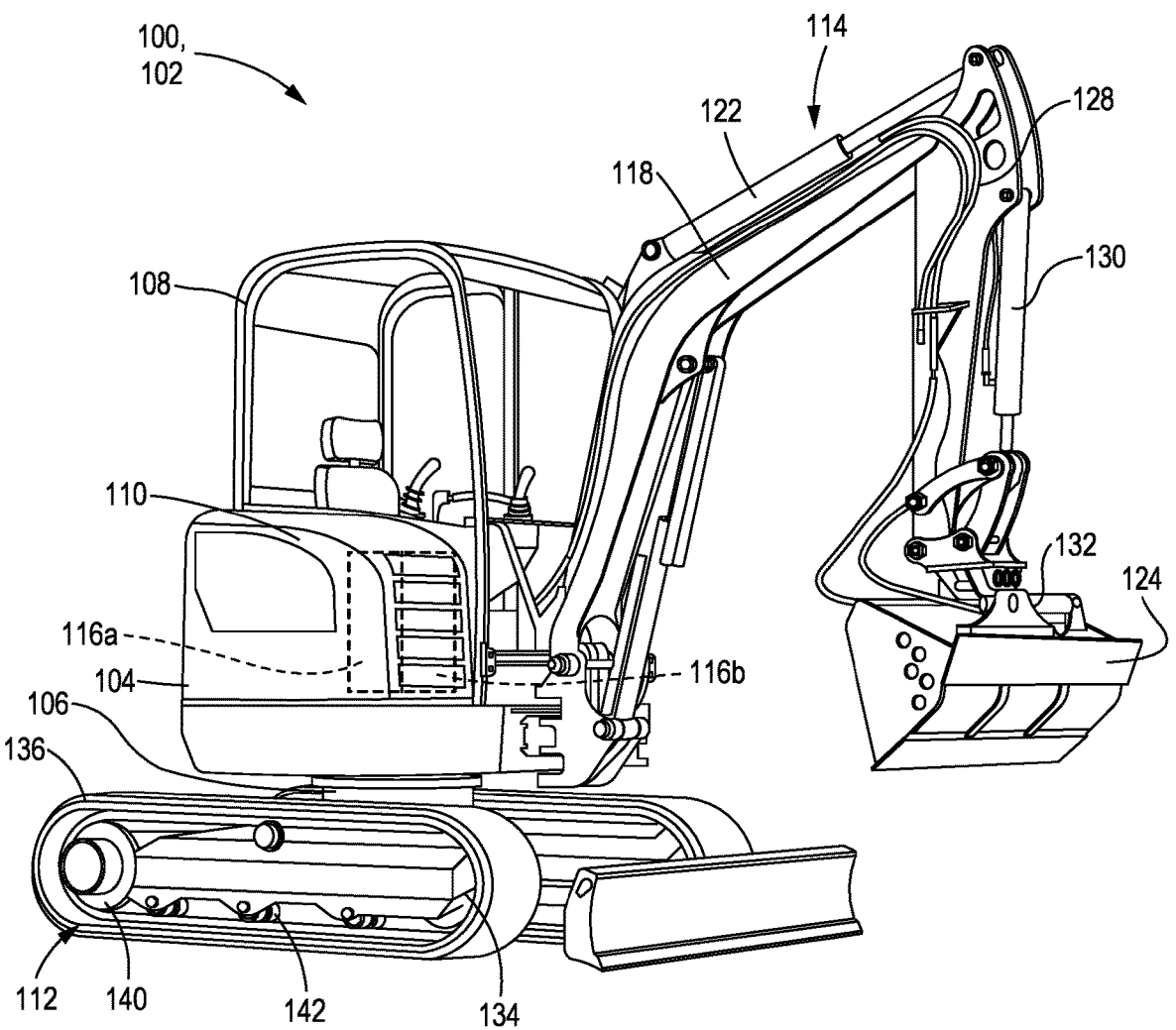
FIG. 1 is a perspective view of one exemplary machine, according to the present disclosure.

FIG. 1 illustrates one example of an electric machine 100 that may incorporate the features of the present disclosure. As used herein, an electric machine 100 may also be referred to as an electric vehicle. For discussion purposes, the following detailed description and drawings are made with reference to an exemplary electric machine 100 that is an excavator 102, however the teachings of this disclosure are not limited to use with excavators 102 and may be employed on other electric machines 100 (e.g., dump trucks, wheel loaders, or like).

The excavator 102 may include an upper frame 104 rotationally connected to a lower frame 106. The upper frame 104 rotates/pivots in both the clockwise and the counterclockwise direction. The upper frame 104 includes an operator station 108 and a body 110. The lower frame 106 includes one or more track assemblies 112. One of ordinary skill in the art will appreciate that the electric machine 100 further includes a plurality of batteries 116 (e.g., a first battery 116*a* and a second battery 116*b*), and a hydraulic system 114. The hydraulic system 114 may be powered by the first and second batteries 116*a,b*.

The excavator 102 further includes a boom 118 pivotably mounted on the body 110, a stick 128 pivotally connected to the boom 118 and an attachment 124 (e.g., a bucket) coupled to the stick 128. In some embodiments, the attachment 124 may be replaced with a swapping tool 120 coupled to the stick 128. Alternatively, in some embodiments, the swapping tool 120 may be mounted to the attachment 124. In yet another alternative, the swapping tool 120 may be a stand-alone tool that is not mounted on the machine 100.

The operator station 108 may be configured to house control levers, joysticks, push buttons, and other types of control elements typically known in the art for actuating an operation of the excavator 102, the track assemblies 112, the boom 118, stick 128 and the attachment 124 and/or swapping tool 120.

In the exemplary excavator 102, the hydraulic system 114 may include boom hydraulic cylinders 122, a stick hydraulic cylinder 130, and an attachment hydraulic cylinder 132. The boom hydraulic cylinders 122 may each be coupled to the boom 118 and configured to actuate movement (raising/lowering) of the boom 118 relative to the body 110. The stick hydraulic cylinder 130 may be coupled to the stick 128 and configured to actuate (pivoting inward/outward) movement of the stick 128 about the boom 118. The attachment hydraulic cylinder 132 may be coupled to the attachment 124 and configured to actuate (pivoting) movement of the attachment 124 and/or swapping tool 120.

Each track assembly 112 may include one or more track driving members 134, a ground engaging track 136, one or more idlers 140, and one or more mid-rollers 142. The track driving members 134 are configured to transmit torque from a powertrain (not shown) to ground engaging tracks 136 to cause translation of the excavator 102 on the work surface.

Figure 3:
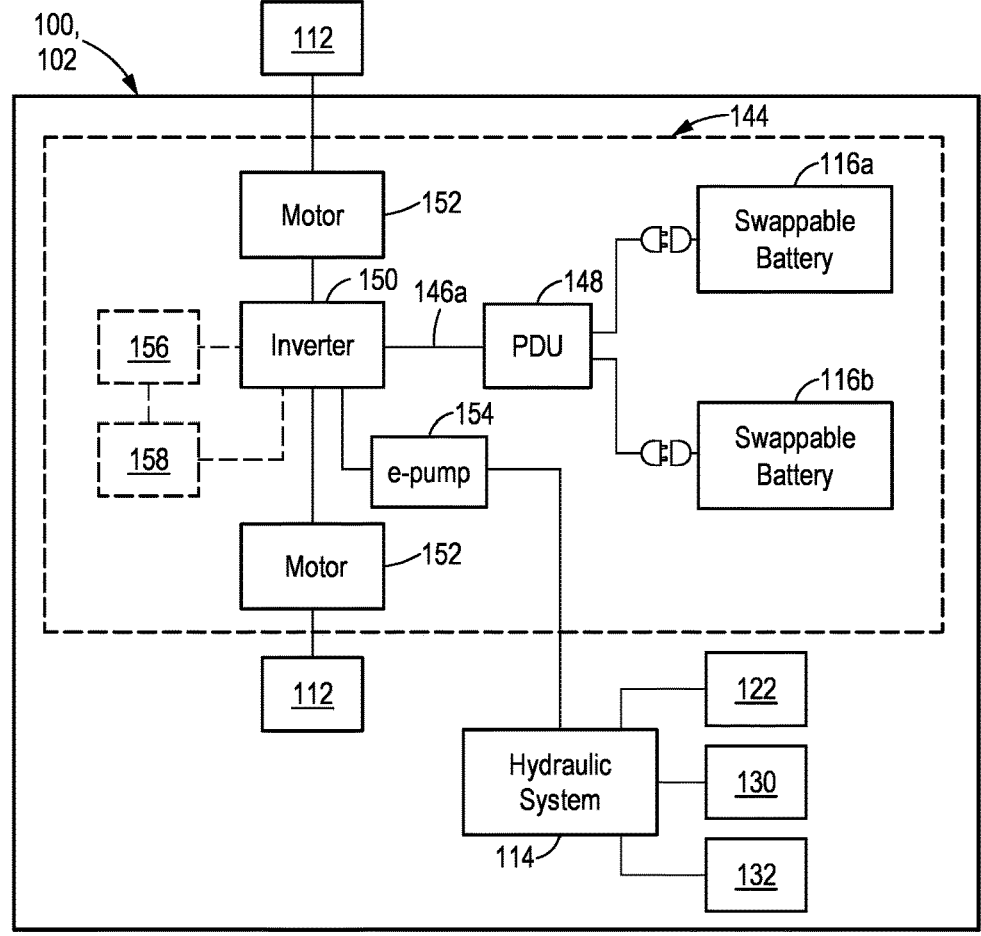
FIG. 3 is an illustration of one exemplary electric system.

Turning now to FIG. 3, one exemplary electric system 144 for the electric machine 100 (e.g., the excavator 102 of FIG. 1) is shown. In an embodiment, the electric system 144 includes the first swappable battery 116*a* and the second swappable battery 116*b*. The electric system 144 may further include a DC link 146, a power distribution unit (PDU) 148, an inverter 150, a plurality of electric motors 152, an electric hydraulic pump (e-pump) 154, an electric actuator 156 and/or other electric components 158 on the electric machine 100.

The DC link 146 is in electrical communication with the first swappable battery 116*a* and the second swappable battery 116*b*, the power distribution unit 148 and the inverter 150. In other embodiments, the DC link 146 may also be in electrical communication with one or more electric motors 152, the e-pump 154, the electric actuator 156 and/or electric components 158 on the machine 100.

The first swappable battery 116*a* is disposed on the electric machine 100 and may be in electrical communication with the power distribution unit 148. The first swappable battery 116*a* may further be in electrical communication with the inverter 150 via the DC link 146. The first swappable battery 116*a* is configured to provide power to the electric machine 100 (e.g., the excavator 102 of FIG. 1) during normal operation of the electric machine 100 and is also configured to provide power to at least a first operation of the electric machine 100 while the second swappable battery 116*b* is removed from the electric machine 100 and replaced with another (charged) substantially the same swappable battery 116. Normal operation of the electric machine 100 refers to work operation of the delectric machine 100, as opposed to a maintenance mode in which available machine operations are limited.

The second swappable battery 116*b* is substantially the same as the first swappable battery 116*a* and is also disposed on the electric machine 100. The second swappable battery 116*b* may be in electrical communication with the power distribution unit 148. The second swappable battery 116*b* may further be in electrical communication with the inverter 150 via the DC link 146. The second swappable battery 116*b* is configured to provide power to the electric machine 100 during normal operation of the electric machine 100 and to at least a second operation of the electric machine 100 while the first swappable battery 116*a* is removed from the electric machine 100.

The electric system 144 may further include the power distribution unit 148 that is configured to receive power from the first swappable battery 116*a* and the second swappable battery 116*b*. In the exemplary electrical system of FIG. 3, the power distribution unit 148 is configured to provide electrical power to the inverter 150. In other configurations of the electric system 144, the power distribution unit 148 may provide electrical power to the electric actuators 156, electric motors 152, e-pump(s) 154 or other electric components 158 via the DC link 146 and without use of the inverter 150.

The inverter 150 is configured to regulate the flow of electrical power to electrical devices such as the electric motors 152, the e-pump 154, electric actuators 156 and/or electric components 158. The inverter 150 converts the DC power provided by the first and second swappable batteries 116 *a*, 116*b* to AC power for use by the electric motors 152, the e-pump 154, electric actuators 156 and/or electric components 158. As a result, the DC input to the inverter 150 becomes an AC output from the inverter 150.

In the exemplary electric system 144, the first and second electric motors 152 are configured to receive power from the inverter 150 to operate the right and left ground engaging track assemblies 112, respectively, of the exemplary excavator 102.

In the exemplary electric system 144, the e-pump 154 is in fluid communication with the hydraulic system 114 for operation of the boom 118 via the boom hydraulic cylinders 122, the stick 128 via the stick hydraulic cylinders 130 and the attachment 124 or swapping tool 120 via the attachment hydraulic cylinders 132.

In the exemplary electric system 144, the electric actuators 156 may be configured to actuate operation of one or more members (e.g, brakes) or electric components 158 (e.g., steering, displays, lights etc.) of the electric machine 100.

In some embodiments, although not all embodiments, the electric machine 100 may further comprise a swapping tool 120 disposed on the electric machine 100 and configured to replace the first swappable battery 116*a* or second swappable battery 116*b* with another swappable battery 116 that is substantially the same as the first/second swappable batteries 116*a*/116*b*. In embodiments in which the swapping tool 120 is disposed on the electric machine 100, the first swappable battery 116*a* is configured to provide power to the electric system 144 to operate the swapping tool 120 during replacement of the second swappable battery 116*b*, and the second swappable battery 116*b* is configured to provide power to the electric system 144 to operate the swapping tool 120 during replacement of the first swappable battery 116a.

Figure 4:
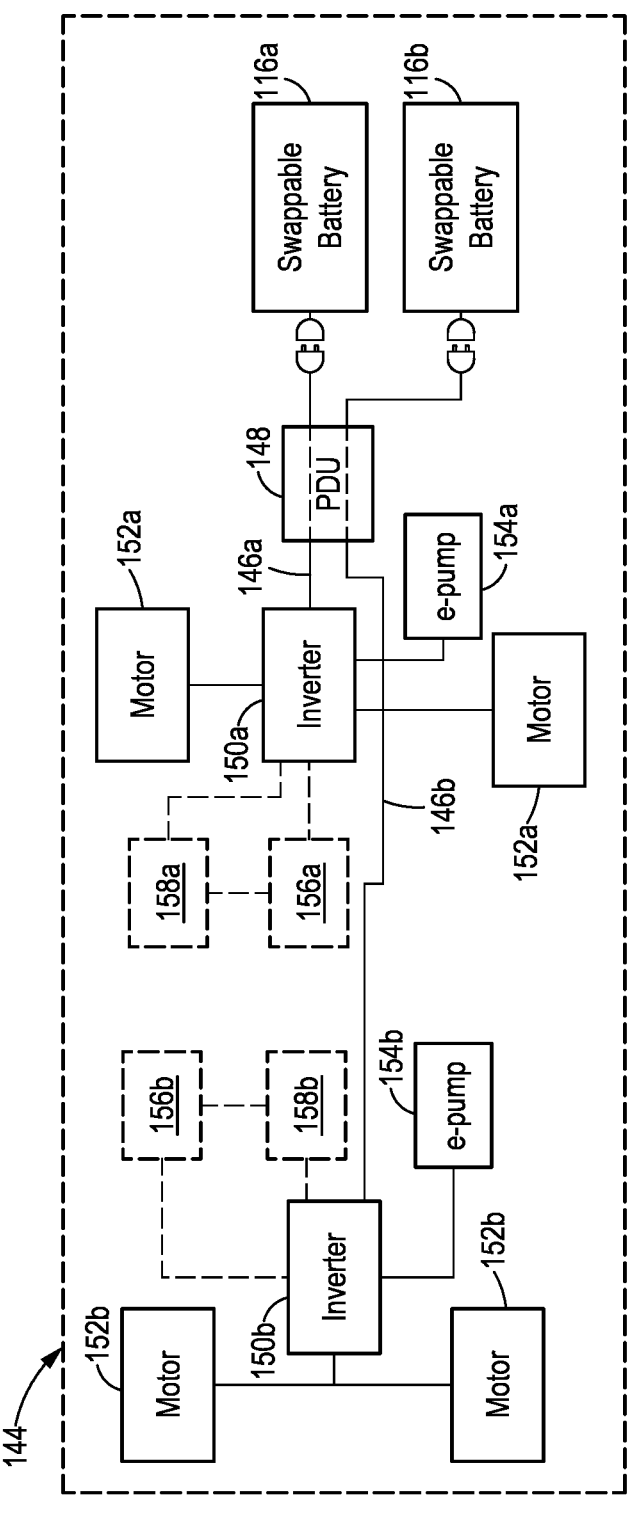
FIG. 4 is an illustration of a second exemplary electric system.

FIG. 4 illustrates yet another exemplary electric system 144 for another electric machine 100 (e.g., a wheel loader, dump truck or the like). In the electrical system of FIG. 4, In an embodiment, the electric system 144 includes the first swappable battery 116a and the second swappable battery 116b. The electric system 144 may further include a first DC link 146a, a power distribution unit (PDU) 148, a first inverter 150a, a first plurality of electric motors 152a, an electric hydraulic pump (e-pump) 154a, an electric actuator 156 and/or other electric components 158 on the electric machine 100. In addition, the electric system 144 may further include a second DC link 146b, a second inverter 150b, a second plurality of electric motors 152a, a second electric hydraulic pump (e-pump) 154b, an electric actuator 156 and/or other electric components 158 on the electric machine 100. Similar to the embodiment of FIG. 3, the first DC link 146a is in electrical communication with the first inverter 150a and with the first swappable battery 116a via the power distribution unit 148. The second DC link 146b is in electrical communication with the second inverter 150b and is in electrical communication with the second swappable battery 116b via the power distribution unit 148. The first DC link 146a is also in electrical communication with the first plurality of electric motors 152a, the first e-pump 154a, the actuator 156a and/or electric components 158a on the machine 100. The second DC link 146b is also in electrical communication with the second plurality of electric motors 152b, the second e-pump 154b, the actuator 156b and/or electric components 158b on the machine 100.

In the embodiment of FIG. 4, the first swappable battery 116a is disposed on the electric machine 100 and may be in electrical communication with the power distribution unit 148. The first swappable battery 116a is further in electrical communication with the first inverter 150a via the first DC link 146a. The first swappable battery 116a is configured to provide power to the electric machine 100 (e.g., the excavator 102 of FIG. 1) via the first DC link 146a during normal operation of the electric machine 100 and is also configured to provide power to at least a first operation of the electric machine 100 via the first DC link 146a while the second swappable battery 116b is removed from the electric machine 100 and replaced with another (charged) substantially the same swappable battery 116.

The second swappable battery 116b is substantially the same as the first swappable battery 116a and is also disposed on the electric machine 100. The second swappable battery 116b is in electrical communication with the power distribution unit 148. The second swappable battery 116b is further in electrical communication with the second inverter 150b via the second DC link 146b. The second swappable battery 116b is configured to provide power to the electric machine 100 during normal operation of the electric machine 100 and to at least a second operation of the electric machine 100 while the first swappable battery 116a is removed from the electric machine 100 via the second DC link 146b. As can be seen in FIG. 4, in this exemplary embodiment, the first swappable battery 116a is dedicated to the first inverter 150a and the first DC link 146a, and the second swappable battery 116b is dedicated to the second inverter 150b and the second DC link 146b. Having multiple inverters with inherent capacitance on the same DC link can contribute to current sloshing issues. The exemplary arrangement in FIG. 4, where the swappable battery 116 is dedicated to a single inverter 150 via a separate DC link 146 eliminates the risk of current sloshing.

In the exemplary electric system 144 of FIG. 4, the first plurality of electric motors 152a are configured to receive power from the first inverter 150a to operate the right and left ground engaging traction devices (e.g., wheels) near the front of the machine 100 and the second plurality of electric motors 152b are configured to receive power from the second inverter 150b to operate the right and left ground engaging traction devices (e.g., wheels) near the rear of the electric machine 100. The first e-pump 154a is in fluid communication with the hydraulic system 114 for operation of hydraulic actuators on the electric machine 100 or a swapping tool 120.

Also disclosed is a method for battery hot swapping on an electric machine 100. The method comprises: after a charge level of the first swappable battery 116a is less than a threshold, disconnecting the first swappable battery 116a from the electric system 144; removing the first swappable battery 116a from the electric machine 100 with a swapping tool 120 while the second swappable battery 116b provides power to one or more operational functions of the electric machine 100 via the electric system 144; replacing on the electric machine 100 the first swappable battery 116a with a third swappable battery 116 using the swapping tool 120, the third swappable battery 116 substantially the same as the first swappable battery 116a; and connecting the third swappable battery 116 to the electric system 144.

INDUSTRIAL APPLICABILITY

Figure 2:
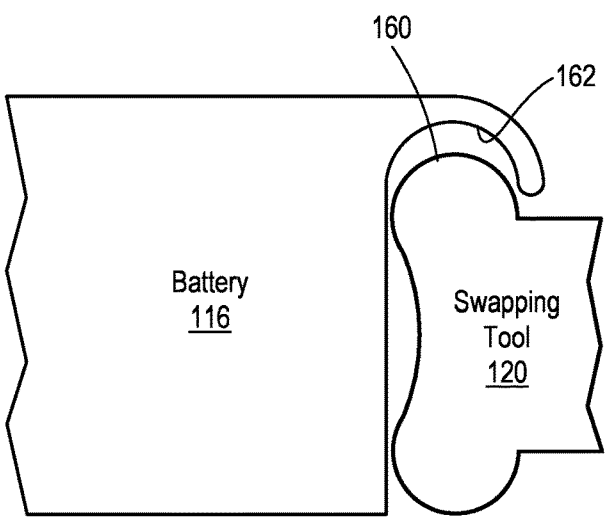
FIG. 2 is an illustration of an exemplary battery and tool interface.
Figure 5:
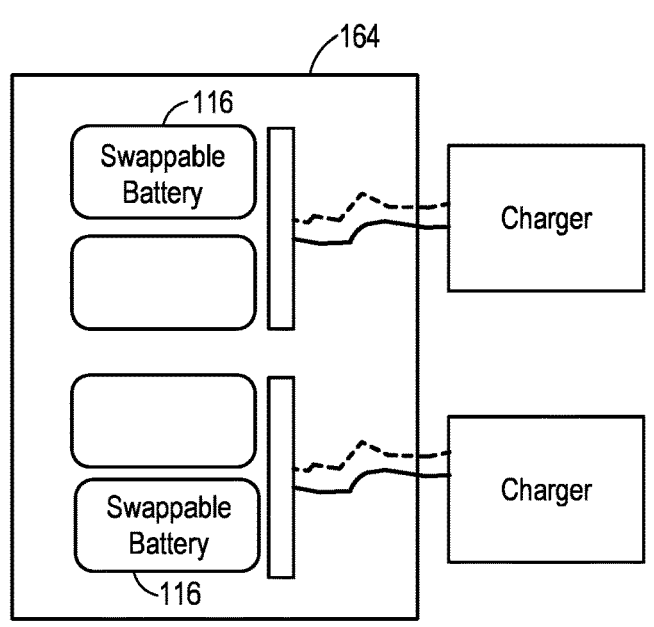
FIG. 5 is an illustration of an exemplary charging station.
Figure 6:
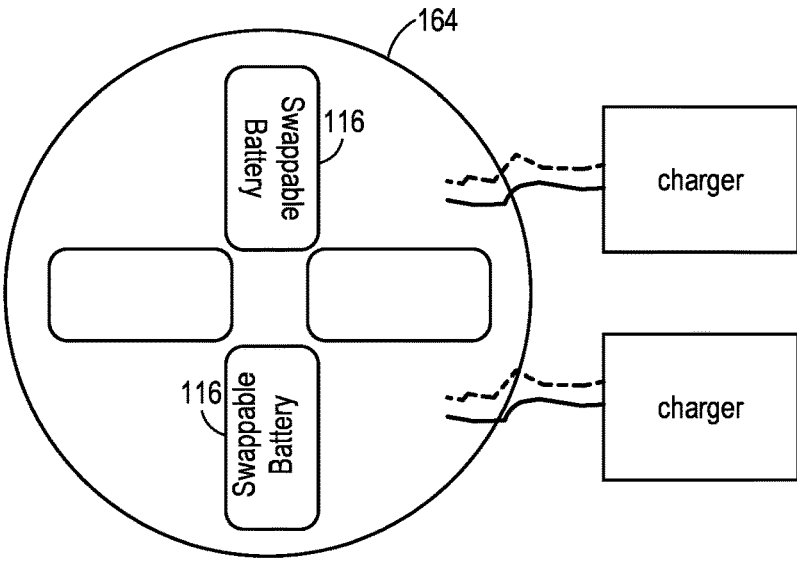
FIG. 6 is an illustration of another exemplary charging station.

After a charge level of the first swappable battery 116a is less than a threshold, the the first swappable battery 116a may be disconnected from the electric system 144. The first swappable battery 116a may be removed from the electric machine 100 with a swapping tool 120 while the second swappable battery 116b provides power to one or more operational functions of the electric machine 100 via the electric system 144. For example, in the embodiment of FIG. 1, the swapping tool 120 may be coupled to the stick 128 of the excavator 102 in place of the attachment 124 (bucket) or may be coupled to or mounted on the attachment 124 itself. When the second swappable battery 116b is replaced, the first swappable battery 116a is configured to provide power to the e-pump 154 to power the hydraulic system 114 to actuate the stick hydraulic cylinders 130 and the attachment hydraulic cylinders 132 so that the operator may position the swapping tool 120 to couple the tool interface 160 (see FIG. 2) to the battery interface 162 and then remove the disconnected second swappable battery 116b from the electric machine 100, place the removed second swappable battery 116b on a receiving station such as a charging station 164 (see FIGS. 5-6) and decouple the second swappable battery 116b from the swapping tool 120, couple the swapping tool 120 to a charged replacement swappable battery 116 (e.g., a third swappable battery 116), move the third swappable battery 116 to the electric machine 100 and position such in the position vacated by the second swappable battery 116b, and decouple the tool interface 160 from the third swappable battery 116. Once connected to the electric system 144, the third swappable battery is configured to provide power to the electric system 144 to facilitate a similar replacement of the second swappable battery 116b with a charged swappable battery 116. The charging station 164 may be stationary or may be rotatable. Alternatively, the swapping tool 120 may not be part of the electric machine 100 but may instead be a standalone tool.

In general, the foregoing disclosure finds utility in electric machines 100. The teachings of this disclosure reduce the wait for battery recharging, and reduce the weight carried on electric machines 100 by eliminating the need to carry extra smaller supplemental "pony" batteries to power machine systems while the main batteries used to power the machine are replaced with recharged batteries. Eliminating the weight of the pony batteries decreases fuel consumption, decrease wiring complexity and increases production efficiency. Moreover, for machines that have distributed power inverters, the teachings herein avoid the wave reflection/ current sloshing that may occur on the DC link that can arise with use of the pony battery during the replacement process.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. An electric vehicle comprising:
an electrical power system that includes:
a first DC link;
a first swappable battery disposed on the electric vehicle and in electrical communication with the first DC link, the first swappable battery configured to provide power to the electric vehicle during normal operation of the electric vehicle and to at least a first operation of the electric vehicle while a second swappable battery is removed from the electric vehicle and replaced; and
the second swappable battery substantially the same as the first swappable battery and disposed on the electric vehicle, the second swappable battery configured to provide power to the electric vehicle during normal operation of the electric vehicle and to at least a second operation of the electrical vehicle while the first swappable battery is removed from the electric vehicle;
a swapping tool of the electric vehicle configured to replace the first swappable battery with a third swappable battery that is substantially the same as the first swappable battery; and
an articulating arm having a distal end with an attachment interface to provide the swapping tool,
wherein the second swappable battery is configured to provide power to operate the swapping tool, as the second operation of the electric vehicle, via movement of the articulating arm of the electric vehicle for the swapping tool of the electric vehicle to replace the first swappable battery with the third swappable battery.

2. The electric vehicle of claim 1, wherein the swapping tool is removably attached to the attachment interface at the distal end of the articulating arm.

3. The electric vehicle of claim 1, wherein the second swappable battery is in electrical communication with the first DC link.

4. The electric vehicle of claim 3, in which the electrical system includes a first inverter in communication with the first swappable battery and the second swappable battery.

5. The electric vehicle of claim 1, in which the electrical system includes a second DC link, wherein the second swappable battery is in electrical communication with the second DC link.

6. The electric vehicle of claim 5, in which the electrical system includes:

a first inverter in electrical communication with the first swappable battery; and
a second inverter in electrical communication with the second swappable battery.

7. A method of battery hot swapping on an electric machine, the electric machine comprising a first swappable battery and a second swappable battery, each of the first swappable battery and the second swappable battery configured to provide power to the electric machine during normal operating mode of the electric machine via an electrical power system disposed on the electric machine, the method comprising:
after a charge level of the first swappable battery is less than a threshold, disconnecting the first swappable battery from the electrical system;
removing the first swappable battery from the electric machine with a swapping tool on an arm of the machine while the second swappable battery of the electric machine provides power to one or more operational functions of the electric machine via the electrical system;
replacing on the electric machine the first swappable battery with a third swappable battery using the swapping tool on the arm of the electric machine, the third swappable battery substantially the same as the first swappable battery; and
connecting the third swappable battery to the electrical system,
wherein said removing and replacing the first swappable battery with the third swappable battery includes movement of the swapping tool in accordance with the arm of the electric machine and with the second swappable battery providing power to operate the arm with the swapping tool for the removal and replacement of the first swappable battery with the third swappable battery.

8. The method of claim 7, wherein the swapping tool is an attachment coupled to the arm of the electric machine.

9. The method of claim 7, further comprising:
after a charge level of the second swappable battery is less than a threshold, disconnecting the second swappable battery from the electrical system;
removing the second swappable battery from the electric machine with the swapping tool while the third swappable battery provides power to one or more operational functions of the electric machine via the electrical system;
replacing on the electric machine the second swappable battery with a fourth swappable battery using the swapping tool; and
connecting the fourth swappable battery to the electrical system.

10. The method of claim 7, wherein the electrical system includes a first DC link and a second DC link, wherein the first swappable battery is connected to the first DC link, and the second swappable battery is connected to the second DC link.

11. The method of claim 7, wherein the electric machine is an excavator and the arm of the electric machine includes a boom and a stick, wherein the swapping tool is coupled to the stick.

12. The method of claim 7, wherein the first swappable battery includes a first interface and the second swappable battery includes a second interface, and the swapping tool includes a tool interface configured to couple to the first interface or the second interface.

13. The method of claim 7 further comprising placing, by the electric machine using the swapping tool, the first swappable battery on a charging station for recharging.

14. An electric machine comprising:

an electrical power system that includes:

a first DC link electrically coupled to a first inverter;

the first inverter electrically coupled to one or more of a motor, a pump, or an actuator of the electric machine;

a first swappable battery disposed on the electric machine and in electrical communication with the first DC link, the first swappable battery configured to provide power to the electric machine during normal operation of the electric machine and to at least a first operation of the electric machine while a second swappable battery is removed from the electric machine and replaced; and the second swappable battery substantially the same as the first swappable battery and disposed on the electric machine, the second swappable battery configured to provide power to the electric machine during normal operation of the electric machine and to at least a second operation of the electrical machine while the first swappable battery is removed from the electric machine; and a swapping tool removably coupled to an arm of the electric machine and configured to replace the first swappable battery with a third swappable battery, wherein the first swappable battery includes a first interface, and the swapping tool includes a tool interface configured to removably couple to the first interface of the first swappable battery to remove the first swappable battery from the electric machine, and wherein the second operation of the electric machine includes the second swappable battery providing power for operation of the motor, the pump and/or the actuator to move the swapping tool, while removably coupled to the arm of the electric machine, to remove the first swappable battery from the electric machine in a state with the tool interface of the swapping tool removably coupled to the interface of the first swappable battery.

15. The electric machine of claim 14 further comprising:

a second DC link electrically coupled to a second inverter, and the second inverter in electrical communication with the second swappable battery, the second inverter electrically coupled to a second motor, a second pump or a second actuator, wherein the first swappable battery is configured to provide power to the first DC link while the second swappable battery is removed from the electric machine and replaced, and wherein the second swappable battery is configured to provide power to the second DC link while the first swappable battery is removed from the electric machine.

* * * * *